United States Patent
Wilson et al.

[11] Patent Number: 5,175,955
[45] Date of Patent: Jan. 5, 1993

[54] FISHING LURE

[75] Inventors: William H. Wilson, Fort Smith, Ark.; Bill Murray, Willis, Tex.

[73] Assignee: Ebsco Industries, Inc., Leeds, Ala.

[21] Appl. No.: 818,868

[22] Filed: Jan. 10, 1992

[51] Int. Cl.⁵ .............................................. A01K 85/00
[52] U.S. Cl. .................................. 43/42.36; 43/42.39
[58] Field of Search ................... 43/42.36, 42.39, 42.4, 43/42.49

[56] References Cited

U.S. PATENT DOCUMENTS

| | | | |
|---|---|---|---|
| 2,365,502 | 12/1944 | Weesner | 43/42.36 |
| 2,625,767 | 1/1953 | Pokras | 43/42.36 |
| 3,483,651 | 12/1969 | Borger | 43/42.39 |
| 4,163,337 | 8/1979 | Kress | 43/42.36 |
| 4,751,789 | 6/1988 | Devereaux et al. | 43/42.39 |
| 4,803,798 | 2/1989 | Hannah | 43/42.36 |
| 4,887,377 | 12/1989 | Morris | 43/42.24 |
| 4,887,378 | 12/1989 | Sheenan et al. | 43/42.25 |
| 4,920,688 | 5/1990 | Devereaux et al. | 43/42.39 |
| 4,942,689 | 7/1990 | Link | 43/42.36 |
| 5,025,586 | 6/1991 | Pixton | 43/42.36 |
| 5,040,325 | 8/1991 | Herrmann | 43/42.36 |

Primary Examiner—Kurt C. Rowan
Attorney, Agent, or Firm—Laney, Dougherty, Hessin & Beavers

[57] ABSTRACT

A jig-type fishing lure which includes a jig head having a portion of a hook shank embedded therein. The hook extends rearwardly from the jig head through a curved bight portion to a barb, and the lure further includes a bore or passageway extending through the jig head parallel to the hook shank in the upper portion of the jig head. A flexible retrieving line is extended through the bore so that one end of this line can be secured around the shank of the hook immediately rearwardly from the jig head. The line emerges from the bore through the jig head at its forward end. Deflecting bristles extend from one side of the jig head toward the barb of the hook and function to enable the lure to more effectively traverse weeds and other obstructions without fouling.

16 Claims, 2 Drawing Sheets

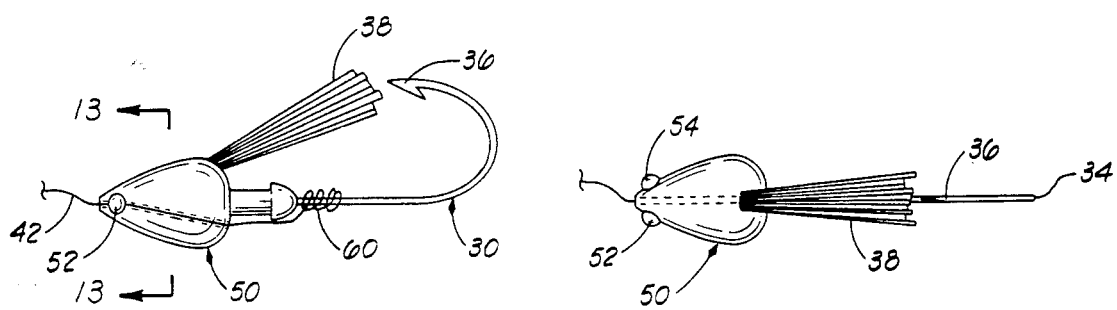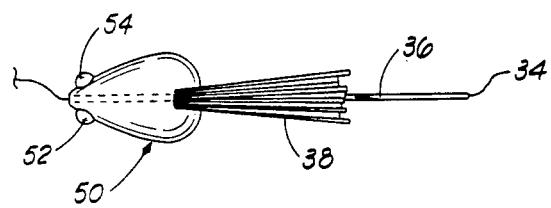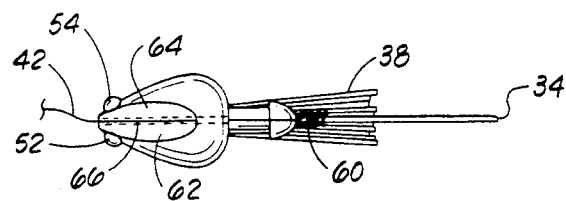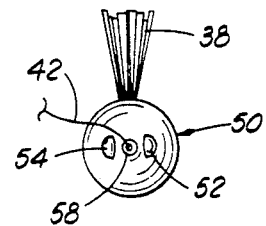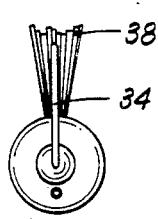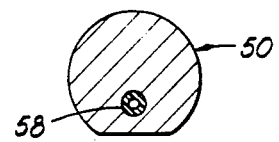

FISHING LURE

FIELD OF THE INVENTION

This invention relates to a fishing lure having a jig head with a skirt-disguised hook projecting therefrom.

BACKGROUND OF THE INVENTION

Brief Description Of The Prior Art

One class of widely used fishing lures is referred to as a jig. Jig-type fishing lures generally have a solid jig head which is often constructed of lead or other heavy metal. A hook projects in some geometry from this head, and is frequently disguised with a flexible skirt or bucktail which surrounds and hides or disguises the hook. A flexible retrieving line is connected to the jig head by an eye which extends into, and is carried by, the jig head. The flexible retrieving line is used for causing the jig to move through the water with a motion imparted to the jig by the fisherman via the flexible retrieving line, and also as a result of the particular geometry which characterizes the lure.

In U.S. Pat. No. 4,887,378, a jig-type fishing lure is described. The lure includes a jig head which carries at one side thereof, an eye for attaching the jig head to a flexible retrieving line which extends to the rod of the fisherman. A substantially planar one-barb hook which has a shank projecting rearwardly from the jig head of the fishing lure has a part of the hook shank embedded in the jig head. In this particular type of jig, guide arms are secured to the jig head and function to engage the floor of the mouth of the fish after the fish has struck the lure, so that the hook inside the mouth of the fish is caused to rotate to a position where it can be more easily set to impale the roof of the mouth of the fish. A bucktail or skirt is provided which is secured around a portion of the jig head and extends rearwardly to disguise the hook by having a number of fronds which surround and obscure the hook. On the bottom side of the jig head, a pair of flat camming surfaces are formed and lie generally symmetrically with respect to a rib or ridge formed at the center of the bottom side of the hook where the two flat camming surfaces intersect each other on the jig head.

Another jig-type fishing lure is that which is disclosed and described in Devereaux and Craig U.S. Pat. Nos. 4,751,789 and 4,920,688. The Devereaux et al patent also includes a jig head molded from a heavy metal, such as lead, with a hook shank carrying a barb projecting from the jig head. A skirt is provided for obscuring or hiding the hook, and an eye for tying a retrieving line to the jig is provided on one side of the jig head.

Yet another fish bait which must be considered to be a jig-type lure is that which is shown in U.S. Pat. No. 4,887,377 to Morris. This lure has a molded lead jig head which is positioned in the nose cavity of a soft plastic shad-type body. A hook extends rearwardly from the jig head with the barb thereof projecting to the outside of the soft plastic shad-type body. A connecting eye is provided at the forward side of the jig head where it projects slightly from the cavity in the soft plastic shad-type body and serves as an anchor point for the flexible retrieving line which extends to the rod of the fisherman.

Many other types of jigs have been heretofore proposed and have had varying success in their fish-catching ability.

BRIEF DESCRIPTION OF THE PRESENT INVENTION

The present invention provides an improved jig-type fishing lure which is especially improved in its ability to ride over limbs and other structure and debris in such a way that the jig head or body of the lure does not rotate about the axis of pull, thereby permitting the hook to be set into, or impaled on, such structure as the lure may contact. The lure also is provided with an effective weed guard element which helps to prevent the hook from becoming snagged in a weed bed as the lure is being retrieved.

Broadly described, the jig-type fishing lure of the invention includes a heavy, solid jig head which can be suitably molded of lead, and which is constituted by two integrally formed adjacent portions. The forward portion of the jig head includes a top or upper surface and a pair of downwardly and inwardly convergent side surfaces which are substantially flat and act as camming surfaces. These converge to a rib or ridge located along the longitudinal center line on the bottom side of the lure. At its rear side, the forward portion of the jig head is joined to a cylindrical shank or neck of an arrow portion of the jig head.

The arrow portion of the jig head, in addition to the shank or neck which has one end secured to the rear side of the forward portion of the jig head, also includes an arrowhead or point pointed rearwardly from the jig head and carried on the opposite end of the neck from the forward portion of the jig head. The lure further carries a hook which consist of an elongated shank, a bight portion and a barb carried on the opposite side of the bight portion from the shank. A part of the hook shank is embedded in the jig head.

An elongated bore or passageway is extended through the jig head along a line which is substantially parallel to the axis of the hook shank. Moreover, this bore is located in the upper portion of the forward part of the jig head, and has an opening at each of its opposite ends. A flexible retrieving line is extended through this bore and has one of its ends secured to the shank portion of the hook just rearwardly from the jig head. The opposite end of the flexible line is, of course, attached to the rod of the fisherman.

A cluster or group of fairly stiff bristles project upwardly and rearwardly from the upper surface of the forward part of the jig head to a point where the outer free ends of the bristles are in close proximity to the barb of the hook. This structure provides a deflecting means by which weeds and other structures traversed by the lure are caused to be deflected away from the barb of the hook and thus function to prevent impalement of the hook during retrieve.

In a preferred embodiment of the invention, a flexible skirt or bucktail is secured around the neck of the arrow-shaped portion of the jig head. Such skirt has a plurality of fronds or filaments which are quite flexible and extend rearwardly to form an obscuring or camouflaging cluster around the hook, preventing a fish from immediately detecting the hook at a time when the lure is being retrieved.

An important object of the present invention is to provide a jig for fishing which suspends the jig head and the lure in general from a portion of the retrieving line extended through the upper portion of the jig head. the flexible retrieving line is passed through the jig head at a location related to a hook having its shank embedded in the jig head so that the center of gravity is lowered in a way which prevents the hook from rolling to impale the hook on a log or other structure across which the lure is pulled in the course of retrieve.

Another object of the invention is to provide an essentially weedless jig-type fishing lure which has the line uniquely attached to the lure to provide better balance and retrieving capabilities, and to prevent snagging of the hook due to rolling of the jig head in the course of retrieve.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 8 is a side elevation view of a modified embodiment of the invention.

FIG. 9 is a top plan view of the modified embodiment of the invention shown in FIG. 8.

FIG. 10 is a bottom plan view of the modified embodiment of the invention shown in FIG. 8.

FIG. 11 is a front elevation view of the modified embodiment of the invention.

FIG. 12 is a rear elevation view of the modified embodiment of the invention.

FIG. 13 is a sectional view taken along line 13—13 of FIG. 8.

DETAILED DESCRIPTION OF A PREFERRED EMBODIMENT OF THE INVENTION

Figure 6:
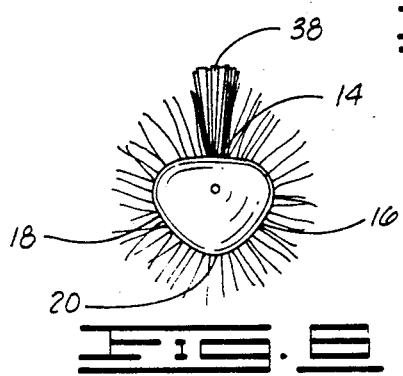
FIG. 6 is a front elevation view of the lure as it appears when viewed from ahead, and without illustrating the flexible retrieving line.
Figure 7:
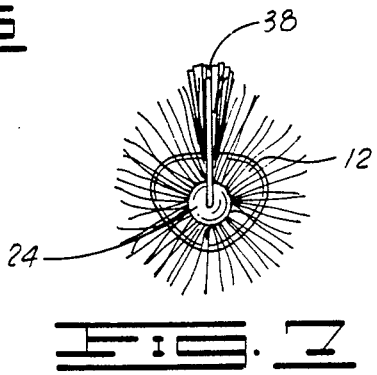
FIG. 7 is a rear elevation view of the lure as it appears when viewed from the rear thereof.

The fishing lure of the invention includes a solid jig head, denominated generally by reference numeral 10. The jig head 10 includes a large forward section which has a rear side 12, an upper side 14 and a pair of convergent lateral sides 16 and 18 (see FIGS. 6 and 7). The convergent lateral sides 16 and 18 converge to a ridge or rib 20 extending centrally along the bottom side of the jig head opposite the upper side 14. The lateral sides 16 and 18 and the upper side 14 also converge to a narrowed forward end denominated generally by reference numeral 22 as shown in FIGS. 1-5. The rear side 12 of the forward portion of the jig head extends transversely between the lateral side surfaces 16 and 18 and from the top surface 14 to the central lower rib 20.

The rear portion of the jig head 10 is shaped as an arrow which has a conically-shaped rearwardly pointing arrowhead or point 24 at the rear side thereof. The rearward arrow-shaped portion of the jig head further includes a generally cylindrical shank 26 which interconnects the arrowhead or point 24 with the rear side of the forward section of the jig head. In a preferred construction of the jig head, the rearwardly extending arrow-shaped portion, which includes the head or point 24 and the shank 26, is formed integrally with the forward portion of the jig head, and the entire body thereof may be made of lead or other non-buoyant material.

Figure 1:
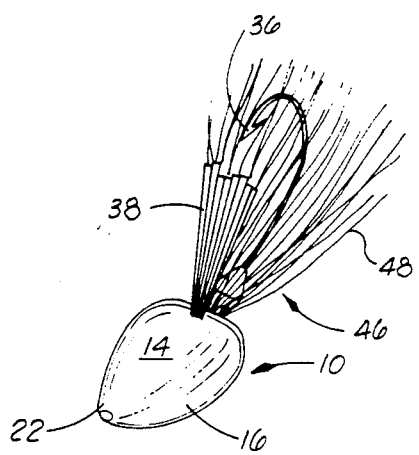
FIG. 1 is a top forward perspective view of the fishing lure constructed in accordance with the present invention. The flexible retrieving line has been omitted from this view of the lure for clarity of illustration.
Figure 2:
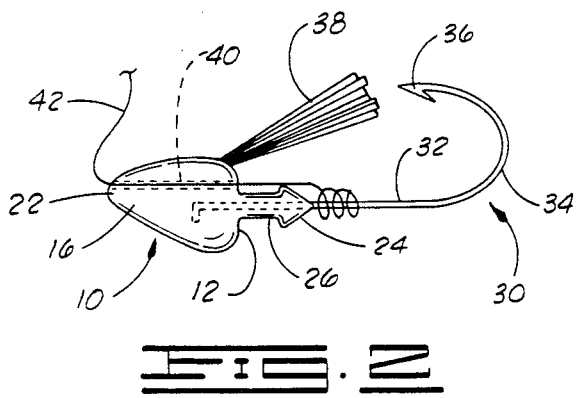
FIG. 2 is a side elevation view of the lure depicted in FIG. 1. For clarity of illustration, the skirt or bucktail has been removed from the lure.
Figure 3:
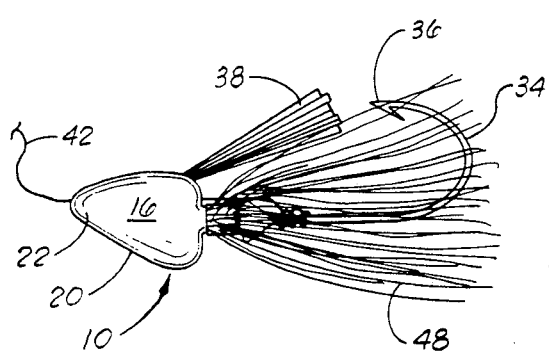
FIG. 3 is a side elevation view of the lure depicted in FIGS. 1 and 2 with a skirt or bucktail illustrated as attached to the neck of the jig head.
Figure 4:
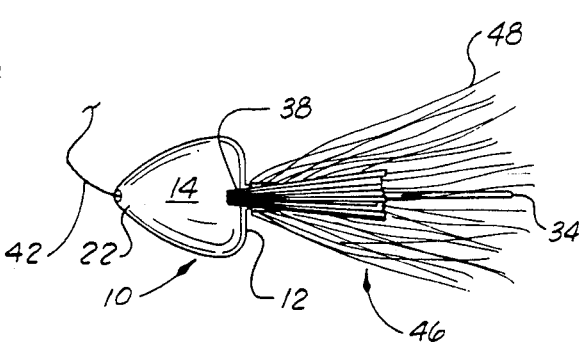
FIG. 4 is a top plan view of the lure illustrated in FIGS. 1 and 3.
Figure 5:
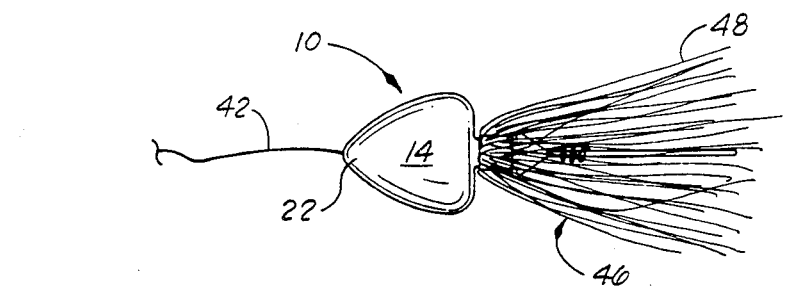
FIG. 5 is a bottom plan view of the lure.

A hook, designated generally by reference numeral 30, is mounted in the jig head by embedding the free end portion of a shank 32 in the jig head so that the axis of the hook shank extends in coaxial alignment with the axis of the shank 26 of the arrow part of the jig head, as best illustrated by the dash line depiction in FIG. 2. This serves to mount the hook 30 rigidly in the jig head 10 with a slightly bent portion of the hook shank well inside the forward portion of the jig head, and the remaining portion of the shank extending outwardly and rearwardly from the arrow part until it is curved through a bight portion, denominated by reference numeral 34. The hook ultimately terminates in a barb 36. The barb 36 and bight portion 34 and shank 32 are all oriented in a vertical plane which bisects the jig head and contains, in addition, the axis of the rearwardly extending arrow portion of the jig head which includes the shaft 26 and the arrowhead portion or point 24.

Projecting rearwardly from the center of the rear side of the jig head upper surface 14 at a location near the line along which the upper surface intersects the rear surface 12 is a set of upwardly protuberant, relatively stiff bristles or thin wires 38. The bristles 38, which have one end embedded in, or secured tightly within, the jig head 10, extend outwardly toward the barb 36 on the hook 30. The bristles function to prevent the hook from becoming impaled or fouled on weeds or the like. The bristles 38 also generally project in the vertical plane which contains the barb 36 and the shank 32, and function to help characterize the fishing lure of the invention as a "weedless" lure.

A flexible retrieving line passageway or bore 40 is formed through the forward portion of the jig head 10. The axis of the bore 40 extends along a line which lies in the vertical plane containing the shank 32 of the hook 30 and its barb 36. The bore 40 is shown in dashed lines in FIG. 2 and projects parallel to the shank 32 of the hook. The bore 40 is at a location just above the location at which the arrow portion of the jig head projects rearwardly from the forward portion thereof, and is generally in the upper portion of the jig head. the retrieving line 42 used to retrieve the fishing lure is extended through the bore 40 so that the free end of the line can be secured around the shank 32 of the hook 30 at a location where the shank emerges from the point 24 of the arrow portion of the jig head 10. From this location of securement to the shank 32 of the hook 30, the flexible retrieving line 42 extends forwardly through the bore or passageway 40, and from thence to the rod of the fisherman.

A skirt or bucktail 46 has a suitable ring or collar at the forward end thereof by which it is secured around the neck or shank portion 26 of the jig head. The skirt 46 includes a plurality of flexible fronds or filaments 48 which stream rearwardly and hide or disguise the hook 30 in conventional fashion.

It will be noted that the retrieving line 42 is extended through the bore 40, and that the bore is located through the upper portion of the main forward portion of the jig head 10. Moreover the bore, in being extended parallel to the longitudinal axis of the shank 32 of the hook 36 causes the jig to remain in substantially the same attitude as is shown in FIG. 2 at the time when it is retrieved. This means that the barb 36 of the hook is generally oriented in a vertical plane and is positioned substantially above the shank 32 and the arcuate bight portion 34 which are also located approximately in the described vertical plane. Thus, by reason of the suspension of the predominance of the weight of the lure below the line of extension of the flexible retrieving line 42, or stated differently, by placement of the center of gravity at a low point within the jig head body directly below the line 42, the rolling of the lure is resisted, and thus snagging by impalement of limbs or other structure passing beneath the lure during retrieve is obviated.

The lure also tends to be a weedless lure by reason of the function and operation of the bristles 38 which project from the jig head upwardly to a point in close proximity to the barb 36. From the illustration of the lure, it will be seen that the line 42, after extension through the bore 40, can be quickly tied off, or secured around, the shank 32 at the point where it emerges from the point or head of the arrowhead portion of the jig head. The location of the line 42, coupled with the flat camming side surfaces 16 and 18 located on opposite sides of the forward portion of the jig head enable the hook to ride better through the water without impalement of obstructions, and also aid in setting the hook into the upper part of the mouth of a fish after the lure has been struck by the fish.

A modified embodiment of the invention is shown in FIGS. 8–13. In the modified embodiment of the invention, the jig head is denominated by reference numeral 50. It will be perceived that the jig head 50 of the modified embodiment is somewhat more symmetrically-shaped about a fore-and-aft or longitudinal axis than is the jig head 10 of the first embodiment illustrated in FIGS. 1 and 7. The jig head 50 is again preferably formed of lead, or other heavy material, and can be molded in the illustrated configuration.

In the modified embodiment of the invention, a pair of metal eyes or rigid protuberant bumps 52 and 54 are located on the opposite sides of the jig head 50 at the forward end thereof. Both the hard protuberant eyes 52 and 54 are located on a central longitudinal plane through the jig head along its central longitudinal axis. The eyes 52 and 54 have a smooth, arcuate outwardly facing surface and function to assure that as the lure is retrieved across a rock or other structure beneath the surface of the water, the jig head 50 will be caused to rotate or rock due to the camming action of one of the eyes 52 or 54 as it encounters the surface of the rock or other structure. In other words, the eyes 52 and 54 function as camming elements which cause the jig head 50 to rotate about its longitudinal axis until its attitude is that which is shown in FIGS. 8–12 of the drawings—that is, with the barb 36 of the hook 30 pointed upwardly, and the stiff bristles 38 forming the weed guard also extending upwardly and rearwardly into close proximity to the hook. This attitude thus assures that the chance of the hook becoming impaled upon a log, rock or other structure which is located immediately below the lure is minimized. Only the flat smooth bottom of the lure encounters an obstruction at that location.

In the modified embodiment of the lure, the lead or other metallic material of the jig head 50 is formed around an elongated fore-and-aft passageway which in the illustrated embodiment is defined by an elongated plastic or metal tube 58 which projects through the jig head. It will be noted that the tube 58 is inclined downwardly very slightly from the forward end to the rear end of the jig head, and is very slightly angled with respect to the true fore-and-aft longitudinal axis of the jig head. A retrieving line 42 is again extended through the jig head, and in the case of the modified embodiment, is passed through the tube 58. The line 42 is again extended rearwardly to a point where it can be secured around the shank of the hook at the location denominated by reference numeral 60, and illustrated best in FIGS. 8 and 10 of the drawings.

On the bottom side of the jig head 50 of the modified embodiment of the lure, a pair of slightly inclined flat surfaces 62 and 64 are formed and meet in a central rib or ridge 66 extending longitudinally along the bottom side of the jig head. These camming surfaces also function in aid of the lure assuming the proper attitude during retrieve, as shown in FIGS. 8–12.

Although a preferred embodiment of the invention has been herein described, it will be understood that various changes and innovations in the illustrated and described structure can be effected without departure from the basic principles upon which the invention is based. Changes and innovations of this type are therefor deemed to be circumscribed by the spirit and scope of the invention, except as the same may be necessarily limited by the appended claims or reasonable equivalents thereof.

What is claimed is:

1. A fishing lure comprising:
   a jig head having an elongated bore extending therethrough from one side of the jig head to the other side thereof;
   a hook carried on, and projecting from, said jig head and including:
      a barb;
      a convex, arcuate bight portion having said barb formed integrally therewith and located at one end thereof; and
      an elongated shank having a first end connected to said bight portion, and having a second end embedded in said jig head, said shank having a longitudinal axis extending through said jig head and substantially parallel to said bore; and
   a flexible line for retrieving the lure having an end portion extending through the jig head through said elongated bore, and having an end secured to said shank immediately adjacent said jig head.

2. A fishing lure as defined in claim 1 wherein said barb, shank, bight portion and elongated bore all lie in a common plane, and wherein said lure further comprises weed deflecting bristles projecting from said jig head to a position adjacent said barb.

3. A fishing lure as defined in claim 2 wherein said bristles are predominantly located in said common plane.

4. A fishing lure as defined in claim 1 wherein said jig head includes:
   a forward portion defining said elongated bore and having a top surface, a rear surface and a pair of downwardly and inwardly converging side surfaces converging to a central bottom rib; and
   a rearwardly extending arrow-shaped portion including an arrowhead point at the rearmost end thereof, and further including a neck extending from the arrowhead point to said rear surface of said forward portion and there joined to said forward portion, said neck and said arrowhead point surrounding and having embedded therein a portion of said hook shank.

5. A fishing lure as defined in claim 4 and further characterized as including a skirt including:
- a part secured around said neck of said arrow-shaped portion of said jig head; and
- a plurality of flexible fronds projecting rearwardly from said part into a position around said hook for disguising said hook.

6. A fishing lure as defined in claim 5 wherein said barb, shank, bight portion and elongated bore all lie in a common plane, and wherein said lure further comprises weed deflecting bristles projecting from said jig head to a position adjacent said barb.

7. A fishing lure as defined in claim 4 wherein said barb, shank, bight portion and elongated bore all lie in a common plane, and wherein said lure further comprises weed deflecting bristles projecting from said jig head to a position adjacent said barb.

8. A fishing lure as defined in claim 5 wherein said arrowhead point has a greater thickness than said neck whereby said fronds must occupy an expanded array in passing around said arrowhead point from said part of the skirt secured around said neck.

9. A fishing lure as defined in claim 8 and further characterized by inclusion of multiple weed deflecting bristles projecting from said jig head toward said barb.

10. A fishing lure as defined in claim 1 and further characterized as including:
- a pair of protuberant camming bumps including two bumps located on opposite sides of said elongated bore at the forward side of said jig head, each of said bumps protruding outwardly from said jig head and each having a smoothly arcuate, outwardly facing contact surface whereby said lure will usually be rolled into a non-fouling attitude by contact of one of said camming bumps with an obstruction located below the lure in the water.

11. A lure as defined in claim 1 and further characterized as including a tube surrounding, and coextensive in length with, said bore, and slidably surrounding a part of said end portion of said flexible line, said tube being embedded in, and surrounded by, said jig head.

12. A fishing lure comprising:
- a metallic jig head which includes a forward portion and a rearwardly extending arrow-shaped portion, said forward portion including a rear surface, and said forward portion defining an elongated bore extending therethrough and opening in said rear surface; and
- said rearwardly extending arrow-shaped portion including:
  - an arrowhead point; and
  - an elongated neck secured between said rear surface and said arrowhead point;
- a skirt secured around said neck and projecting rearwardly therefrom;
- a hook connected to said jig head and obscured by said skirt, said hook including:
  - a barb;
  - a convex, arcuate bight portion having said barb formed integrally therewith and located at one end thereof; and
  - an elongated shank having a first end connected to said bight portion and having a second end embedded in said jig head, said shank having a longitudinal axis which, when projected, extends through said jig head; and
- a flexible retrieving line having an end secured to said hook and extending through the elongated bore in the forward portion of said jig head.

13. A fishing lure as defined in claim 12 and further characterized as including:
- a pair of protuberant camming bumps including two bumps located on opposite sides of said elongated bore on the forward portion of said jig head, each of said bumps protruding outwardly from the forward portion of said jig head and each having a smoothly arcuate, outwardly facing contact surface whereby said lure will usually be rolled into a non-fouling attitude by contacting one camming bump with an obstruction located below the lure in the water.

14. A fishing lure as defined in claim 12 wherein said barb, shank, bight portion and elongated bore all lie in a common plane, and wherein said lure further comprises weed deflecting bristles projecting from said jig head to a position adjacent said barb.

15. A fishing lure comprising:
- a heavy metallic jig head which includes a forward portion and a rearwardly extending arrow-shaped portion, said forward portion including a rear surface, and a top surface and a pair of downwardly and inwardly converging side surfaces converging to a central bottom rib; and
- a rearwardly extending arrow-shaped portion including:
  - an arrowhead point; and
  - an elongated neck secured between said rear surface and said arrowhead point;
- a skirt secured around said neck and projecting rearwardly therefrom;
- a hook connected to said jig head and obscured by said skirt, said hook including:
- a barb, a bight portion and a shank lying in a common plane with said neck portion of said arrow-shaped portion; and
- a flexible retrieving line having one end secured to said hook and having a portion extending through said jig head and lying in said common plane with said barb, bight portion and shank of said hook.

16. A fishing lure comprising:
- a metallic jig head which includes a forward portion and a rearwardly extending arrow-shaped portion, said forward portion including a rear surface, and a top surface and a pair of downwardly and inwardly converging side surfaces converging to a central bottom rib, and said jig head having an elongated bore extending therethrough;
- said rearwardly extending arrow-shaped portion including:
  - an arrowhead point; and
  - an elongated neck secured between said rear surface and said arrowhead point;
- a skirt secured around said neck and projecting rearwardly therefrom;
- a hook connected to said jig head and obscured by said skirt, said hook including a barb, a bight portion and a shank lying in a common plane;
- a flexible retrieving line having one end secured to said hook and extending through the elongated bore through said jig head; and
- multiple weed deflecting bristles projecting from said jig head toward said barb of said hook.

* * * * *